(12) United States Patent
Willey et al.

(10) Patent No.: US 7,436,791 B2
(45) Date of Patent: Oct. 14, 2008

(54) METHODS AND APPARATUS FOR PROVIDING SLOT RESERVATIONS FOR SLOTTED MESSAGES IN WIRELESS COMMUNICATION NETWORKS

(75) Inventors: William Daniel Willey, San Francisco, CA (US); Muhammad Khaledul Islam, Ottawa (CA)

(73) Assignee: Research In Motion Limited, Waterloo, Ontario (CA)

( * ) Notice: Subject to any disclaimer, the term of this patent is extended or adjusted under 35 U.S.C. 154(b) by 560 days.

(21) Appl. No.: 11/006,380

(22) Filed: Dec. 7, 2004

(65) Prior Publication Data

US 2005/0141464 A1 Jun. 30, 2005

Related U.S. Application Data

(60) Provisional application No. 60/527,868, filed on Dec. 8, 2003.

(51) Int. Cl.
*H04Q 7/20* (2006.01)
*H04B 7/00* (2006.01)
*H04B 7/212* (2006.01)
*H04H 1/00* (2006.01)

(52) U.S. Cl. .................. 370/312; 370/310; 370/337; 455/458

(58) Field of Classification Search .............. 370/341, 370/335, 328, 329, 352, 356, 431, 311, 312, 370/316; 455/456.1, 456.2, 450, 452.1
See application file for complete search history.

(56) References Cited

U.S. PATENT DOCUMENTS

| | | | |
|---|---|---|---|
| 5,511,110 A * | 4/1996 | Drucker | 455/458 |
| 5,745,695 A * | 4/1998 | Gilchrist et al. | 709/227 |
| 5,991,600 A | 11/1999 | Anderson et al. | |
| 6,278,703 B1 | 8/2001 | Neufeld | |
| 6,421,540 B1 | 7/2002 | Gilhousen et al. | |
| 6,509,827 B1 | 1/2003 | Berstis et al. | |
| 6,542,517 B1 * | 4/2003 | Giacalone | 370/465 |

(Continued)

FOREIGN PATENT DOCUMENTS

WO 9534178 12/1995

(Continued)

OTHER PUBLICATIONS

European Search Report, EPO Patent Application # 04821277.3, Jul. 6, 2006.

(Continued)

*Primary Examiner*—Hanh Nguyen
(74) *Attorney, Agent, or Firm*—John J. Oskorep, Esq.

(57) ABSTRACT

In one illustrative example, a mobile communication device transmits a slot reservation indication to the wireless network for reserving each nth paging slot assigned to the mobile device. At some point in time, a page message request for paging the mobile device is received within the wireless network. A page message for paging the mobile device is refrained from being transmitted within a reserved paging slot, but rather within a subsequent paging slot assigned to the mobile device after a lapse of time associated with the reserved paging slot. During the slot reservation, the mobile device may perform a function such as a GPS location fix or network scanning operation.

36 Claims, 6 Drawing Sheets

U.S. PATENT DOCUMENTS

| | | |
|---|---|---|
| 6,600,731 B2 | 7/2003 | Menzel et al. |
| 6,822,973 B2 * | 11/2004 | Kelley et al. ............... 370/503 |
| 2003/0054820 A1 | 3/2003 | Kang et al. |
| 2005/0201311 A1 * | 9/2005 | Willey et al. |

FOREIGN PATENT DOCUMENTS

| | | |
|---|---|---|
| WO | 0059225 | 10/2000 |

OTHER PUBLICATIONS

Eliminate Support of QPCH While Operating in the Reduced Slotted Mode, Oct. 13, 2003, Cherian et al.

International Preliminary Report on Patentability, International Application # PCT/IB2004/004443, May 23, 2006.

International Search Report and Written Opinion, PCT Application # PCT/IB2004/004443, Nov. 28, 2005.

Parag Agashe, Ramin Rezaiifar, Paul Bender, "Expanded Sleep Timer", Oct. 2003, pp. 2-3 to 2-27, C25-20030625-001, Qualcomm Inc.

European Search Report for Application #04817019.5, Dated Apr. 18, 2007.

* cited by examiner

METHODS AND APPARATUS FOR PROVIDING SLOT RESERVATIONS FOR SLOTTED MESSAGES IN WIRELESS COMMUNICATION NETWORKS

CROSS-REFERENCE TO RELATED APPLICATION

This application claims priority to a U.S. Provisional Patent Application entitled "Method Of Reserved Slotted Messaging" having Ser. No. 60/527,868 and filed on 8 Dec. 2003, which is hereby incorporated by reference herein.

BACKGROUND

1. Field of the Technology

The present application relates generally to mobile stations operating in a wireless communication network, and more particularly to methods and apparatus for providing slot reservations for slotted messages in wireless communication networks.

2. Description of the Related Art

A wireless communication device, such as a mobile station operating in a cellular telecommunications network, may provide for both voice telephony and data communications. A mobile station may, for example, be compatible with $2^{nd}$ Generation (2G) communication standards (such as Global System for Mobile Communications) or $3^{rd}$ Generation (3G) communication standards (such as IS-2000 Release 0) and utilize Time Division Multiple Access (TDMA), or Code Division Multiple Access (CDMA) wireless access network technologies.

In CDMA communications defined by IS-2000, a mobile station operating in a normal slotted mode wakes up periodically and monitors its assigned paging channel slots for messages that are directed to the mobile station such as a Page Message. The mobile station monitors for mobile-directed messages in paging slots at an interval of $1.28 * 2^i$ seconds, where i is an integer value ranging from 0 to 7. The value of i is referred to as a "Slot Cycle Index" and is chosen by the mobile station and registered with the infrastructure. Slotted messaging has been utilized in wireless communication networks for many years in an effort to conserve battery power in mobile stations.

In Release D of IS-2000, a new feature that allows mobile stations to operate in a "reduced slotted mode" while idling and monitoring for slotted messages has been defined. Specifically, values of −4 to −1 are allowed as possible values for the Slot Cycle Index i for the reduced slotted mode. This enables faster call setup times for mobile-terminated calls. A shortened slot cycle for faster call setup is highly desirable for certain applications, such as Push-To-Talk (PTT) communication applications. The reduced slotted mode may be negotiated between the mobile station and the infrastructure at the time of call release, for example. In this case, the agreed upon value of i for the reduced slotted mode is active for a period of time before the mobile station and the infrastructure revert to the prior value of i for the normal slotted mode. Furthermore, when the mobile station is idle a new value of i can be negotiated to be active for a period of time.

Another reason that a mobile station may request to operate in the reduced slotted mode is unrelated to the need for fast call setup or PTT communications. In particular, if a mobile station is operating with a relatively high capacity or large power source (e.g. a wall power source, an automobile power source, or a PC power source through USB connection), it may request a shortened slot cycle as power savings is not a concern. The mobile station requests the reduced slot cycle in order to benefit from reduced call setup times even when another feature that requires it (e.g. PTT communications) is not active.

In the normal slotted mode, the mobile station has a relatively large amount of time in between its assigned paging slots. During this time period, the mobile station is able to operate in a "sleep mode" or perform any other operation that would otherwise not be possible while monitoring for slotted messages. Such operations include searching for a Global Positioning System (GPS) signal, scanning other CDMA frequencies different from the current one, or scanning for other wireless networks such as 802.11 (e.g. WiFi), GSM/GPRS, or UMTS networks. In the reduced slotted mode, however, the mobile station no longer has adequate time to perform such operations. If the mobile station performs such an operation in the reduced slotted mode, it may miss an assigned paging slot. If the infrastructure happens to send a message to the mobile station during this paging slot, the mobile station will miss the message. If the message is for setting up a call, then this may create a significant delay in call setup. It is for this reason that conventional mobile stations cannot suitably operate in this fashion while in the reduced slotted mode.

Other communication technologies may exhibit similar problems. Accordingly, what are needed are improved techniques for slotted messaging in wireless communication networks.

SUMMARY

Methods and apparatus for providing slot reservations for slotted messages in a wireless communication network are described herein. In one illustrative example, a mobile communication device transmits a slot reservation indication to the wireless network for reserving each nth paging slot(s) assigned to the mobile device. At some point in time, a page message request for paging the mobile device is received within the wireless network. A page message for paging the mobile device is refrained from being transmitted within a reserved paging slot(s), but rather within a subsequent paging slot assigned to the mobile device after a lapse of time associated with the reserved paging slot(s). During the slot reservation, the mobile device may perform a function such as a GPS location fix or network scanning operation.

In an alternative approach, the wireless network may infer a reservation for the mobile device through use of a neighbor list message associated with it. For example, the wireless network may examine a neighbor list message sent on a control channel such as the Paging Channel or the Broadcast Common Control Channel. Here, the wireless network may identify within the message the presence of a frequency different from the current network frequency, or the presence of a wireless technology different from that of the current network, and set the reservation for the mobile device in response.

BRIEF DESCRIPTION OF THE DRAWINGS

Embodiments of present application will now be described by way of example with reference to attached figures, wherein.

DETAILED DESCRIPTION OF THE PREFERRED EMBODIMENTS

Methods and apparatus for providing slot reservations for slotted messages in a wireless communication network are described herein. In one illustrative example, a mobile communication device transmits a slot reservation indication to the wireless network for reserving each nth paging slot assigned to the mobile device. At some point in time, a message request (e.g. a page message request for paging) for the mobile device is received within the wireless network. The message for the mobile device is refrained from being transmitted within a reserved paging slot, but rather within a subsequent paging slot assigned to the mobile device after a lapse of time associated with the reserved paging slot. During the slot reservation, the mobile device may perform a function such as a GPS location fix or network scanning operation. In an alternative approach, the wireless network may infer a reservation for the mobile device through use of a neighbor list message associated with it. For example, the wireless network may examine a neighbor list message referred to as a General Neighbor List Message sent on a control channel such as the Paging Channel or the Broadcast Common Control Channel. Here, the wireless network may identify within the message the presence of a frequency different from the current network frequency, or the presence of a wireless technology different from that of the current network, and set the reservation for the mobile device in response.

Figure 1:
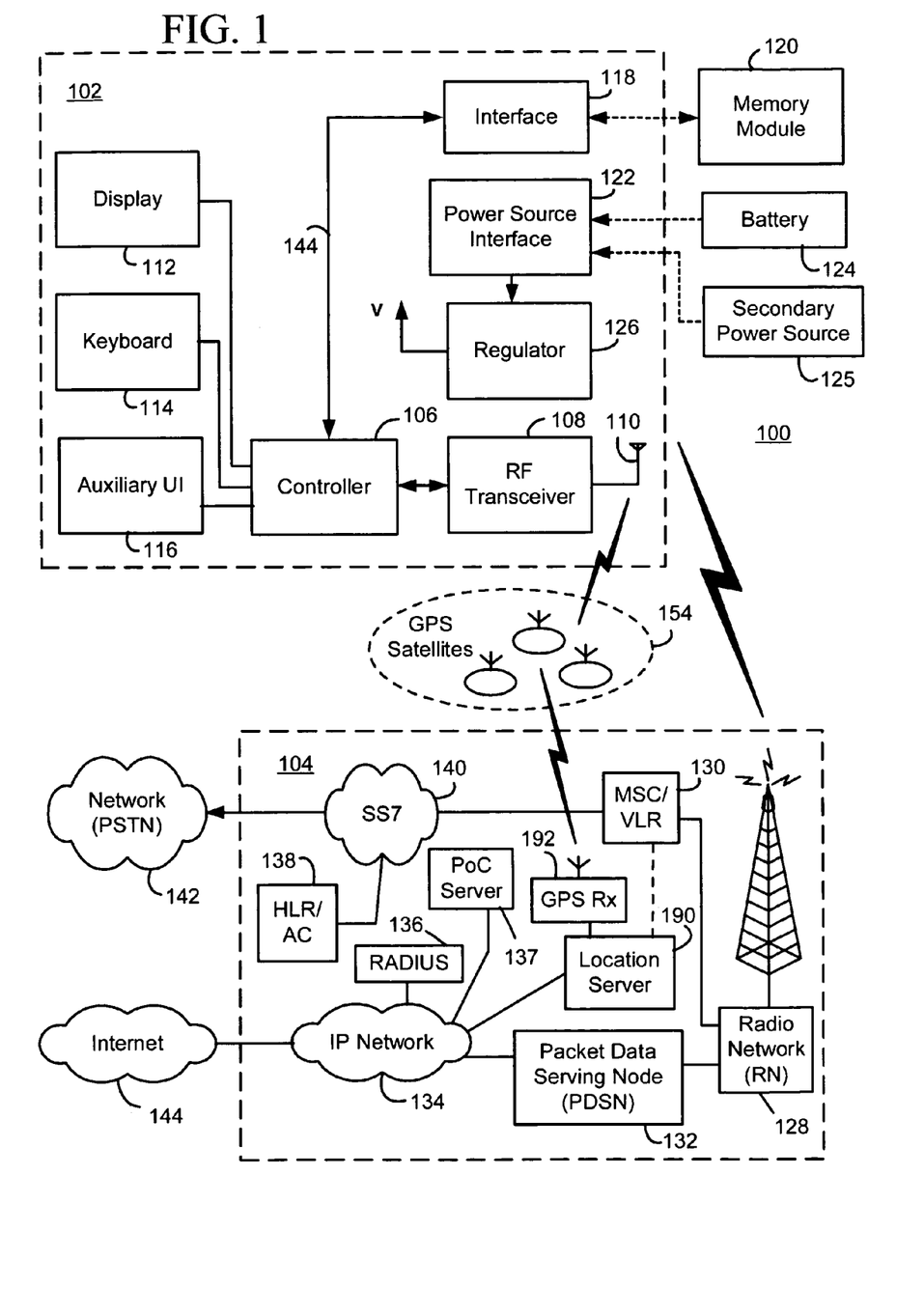
FIG. 1 is a block diagram which illustrates pertinent components of a mobile station and a wireless communication network.

FIG. 1 is a block diagram of a communication system 100 which includes a mobile communication device 102 which communicates through a wireless communication network 104. Mobile device 102 preferably includes a visual display 112, a keyboard 114, and perhaps one or more auxiliary user interfaces (UI) 116, each of which is coupled to a controller 106. Controller 106 is also coupled to radio frequency (RF) transceiver circuitry 108 and an antenna 110.

Typically, controller 106 is embodied as a central processing unit (CPU) which runs operating system software in a memory component (not shown). Controller 106 will normally control overall operation of mobile device 102, whereas signal processing operations associated with communication functions are typically performed in RF transceiver circuitry 108. Controller 106 interfaces with device display 112 to display received information, stored information, user inputs, and the like. Keyboard 114, which may be a telephone type keypad or full alphanumeric keyboard, is normally provided for entering data for storage in mobile device 102, information for transmission to network 104, a telephone number to place a telephone call, commands to be executed on mobile device 102, and possibly other or different user inputs.

Mobile device 102 sends communication signals to and receives communication signals from network 104 over a wireless link via antenna 110. RF transceiver circuitry 108 performs functions similar to those of a radio network (RN) 128, including for example modulation/demodulation and possibly encoding/decoding and encryption/decryption. RF transceiver circuitry 108 may perform certain functions in addition to those performed by RN 128. It will be apparent to those skilled in art that RF transceiver circuitry 108 will be adapted to particular wireless network or networks in which mobile device 102 is intended to operate. When mobile device 102 is fully operational, an RF transmitter of RF transceiver circuitry 108 is typically turned on only when it is sending to network, and is otherwise turned off to conserve resources. Similarly, an RF receiver of RF transceiver circuitry 108 is typically periodically turned off to conserve power until it is needed to receive signals or information (if at all) during designated time periods.

Preferably, the RF transceiver circuitry 108 has a first transceiver portion for communicating with wireless network 104 (e.g. cellular network) and a second transceiver portion for communicating with an alternative wireless network. For example, the first transceiver portion may be for communicating with a Personal Communication Services (PCS) network and the second transceiver portion may be for communicating with a GPS network. Antenna 110 is shared by the first and the second transceiver portions of RF transceiver circuitry 108. With this configuration, it is difficult for mobile device 102 to receive information from both networks at the same time, and if switching is performed then information from one network or the other will be missed.

Mobile device 102 includes a power source interface 122 for receiving one or more rechargeable batteries. 124. Battery 124 provides electrical power to electrical circuitry in mobile device 102, and power source interface 122 provides for a mechanical and electrical connection for battery 124. Power source interface 122 is coupled to a regulator 126 which regulates power to the device. Power source interface 122 is also adapted to connect with a secondary power source 125. Secondary power source 125 is a larger or higher capacity power source than battery 124. Secondary power source 125 provides an indefinite supply of power to mobile device 102. Secondary power source 125 may be, for example, an AC wall power source, an automobile power source through a "cigarette lighter" or other suitable connection, or a PC power source through a Universal Serial Bus (USB) connection.

Mobile device 102 operates using a memory module 120, such as a Subscriber Identity Module (SIM) or a Removable User Identity Module (R-UIM), which is connected to or inserted in mobile device 102 at an interface 118. As an alternative to a SIM or an R-UIM, mobile device 102 may operate based on configuration data programmed by a service provider into a non-volatile memory of mobile device 102. Mobile device 102 may consist of a single unit, such as a data communication device, a cellular telephone, a multiple-function communication device with data and voice communication capabilities, a personal digital assistant (PDA) enabled for wireless communication, or a computer incorporating an internal modem. Alternatively, mobile device 102 may be a multiple-module unit comprising a plurality of separate components, including but in no way limited to a computer or other device connected to a wireless modem. In particular, for example, in the mobile station block diagram of FIG. 1, RF transceiver circuitry 108 and antenna 110 may be implemented as a radio modem unit that may be inserted into a port on a laptop computer. In this case, the laptop computer would include display 112, keyboard 114, and one or more auxiliary UIs 116. Controller 106 is either embodied as the computer's CPU or a separate CPU within the modem unit. It is also contemplated that a computer or other equipment not normally capable of wireless communication may be adapted to connect to and effectively assume control of RF transceiver circuitry 108 and antenna 110 of a single-unit device such as one of those described above. Such a mobile device 102 may have a more particular implementation as described later in relation to mobile station 202 of FIG. 2.

Mobile device 102 communicates in and through wireless communication network 104. In the embodiment of FIG. 1, wireless network 104 is a Second Generation (2G) or Third Generation (3G) supported network based on Code Division Multiple Access (CDMA) technologies. In particular, wireless network 104 is a CDMA20000® network which includes fixed network components coupled as shown in FIG. 1. Wireless network 104 of the CDMA2000-type includes a Radio Network (RN) 128, a Mobile Switching Center (MSC) 130, a Signaling System 7 (SS7) network 140, a Home Location Register/Authentication Center (HLR/AC) 138, a Packet Data Serving Node (PDSN) 132, an IP network 134, and a Remote Authentication Dial-In User Service (RADIUS) server 136. SS7 network 140 is communicatively coupled to a network 142 (such as a Public Switched Telephone Network or PSTN) which may connect mobile device 102 with other call parties such as a call party 150 (e.g. a landline telephone or other mobile station) or an emergency call center 152. On the other hand, IP network 134 is communicatively coupled to another network 144 such as the Internet. Note that CDMA2000® is a registered trademark of the Telecommunications Industry Association (TIA-USA).

During operation, mobile device 102 communicates with RN 128 which performs functions such as call-setup, call processing, and mobility management. RN 128 includes a plurality of base station transceiver systems that provide wireless network coverage for a particular coverage area commonly referred to as a "cell". A given base station transceiver system of RN 128, such as the one shown in FIG. 1, transmits communication signals to and receives communication signals from mobile stations within its cell. The base station transceiver system normally performs such functions as modulation and possibly encoding and/or encryption of signals to be transmitted to the mobile station in accordance with particular, usually predetermined, communication protocols and parameters, under control of its controller. The base station transceiver system similarly demodulates and possibly decodes and decrypts, if necessary, any communication signals received from mobile device 102 within its cell. Communication protocols and parameters may vary between different networks. For example, one network may employ a different modulation scheme and operate at different frequencies than other networks. The underlying services may also differ based on its particular protocol revision.

The wireless link shown in communication system 100 of FIG. I represents one or more different channels, typically different radio frequency (RF) channels, and associated protocols used between wireless network 104 and mobile device 102. Those skilled in art will appreciate that a wireless network in actual practice may include hundreds of cells depending upon desired overall expanse of network coverage. All pertinent components may be connected by multiple switches and routers (not shown), controlled by multiple network controllers.

For all mobile station's 102 registered with a network operator, permanent data (such as mobile device 102 user's profile) as well as temporary data (such as mobile station's 102 current location) are stored in a HLR/AC 138. In case of a voice call to mobile device 102, HLR/AC 138 is queried to determine the current location of mobile device 102. A Visitor Location Register (VLR) of MSC 130 is responsible for a group of location areas and stores the data of those mobile stations that are currently in its area of responsibility. This includes parts of the permanent mobile station data that have been transmitted from HLR/AC 138 to the VLR for faster access. However, the VLR of MSC 130 may also assign and store local data, such as temporary identifications. Mobile device 102 is also authenticated on system access by HLR/AC 138. In order to provide packet data services to mobile device 102 in a CDMA2000-based network, RN 128 communicates with PDSN 132. PDSN 132 provides access to the Internet 144 (or intranets, Wireless Application Protocol (WAP) servers, etc.) through IP network 134. PDSN 132 also provides foreign agent (FA) functionality in mobile IP networks as well as packet transport for virtual private networking. PDSN 132 has a range of IP addresses and performs IP address management, session maintenance, and optional caching. RADIUS server 136 is responsible for performing functions related to authentication, authorization, and accounting (AAA) of packet data services, and may be referred to as an AAA server.

Wireless communication network 104 typically includes a position determination entity (PDE) that provides mobile stations with location determination assistance. Location determinations for mobile stations are obtained based on Global Positioning System (GPS) techniques utilizing GPS satellites of a conventional GPS system 154. In a typical configuration, GPS system 154 includes twenty-four (24) GPS satellites that circle the earth every twelve (12) hours. The PDE is coupled to a GPS receiver 192 for receiving signals and decoding information transmitted by GPS system 154. Based on a coarse estimation on mobile station's location, the PDE provides information about the visible GPS satellites such that the mobile station can perform a relatively quick "GPS fix". Mobile stations typically send measurements (such as GPS pseudo-range measurements) to the PDE which, in turn, computes the location of the mobile station. In some cases, mobile stations can act as stand-alone GPS receivers which do not require any assistance from the PDE.

In the present application, mobile device 102 measures GPS pseudo-ranges based on signals received from GPS system 154 with optional acquisition assistance from the PDE, and may utilize a location server 190 in wireless network 104 to obtain its location based on its measurements when necessary. In particular, during operation of mobile device 102, real-time GPS location information may be obtained and sent to a receiving entity. Conventionally, mobile device 102 may perform a GPS fix where mobile device 102 tunes to a GPS signal frequency of GPS system 154 which is different than that utilized for communications with the cellular network. During the GPS fix, mobile device 102 receives GPS signals from GPS system 154 which correspond to location information. This may be performed on a regular/periodic or ad-hoc basis. Where the receive path is shared between the cellular system and GPS system 154, mobile device 102 tunes away from the cellular network one or more times and, for each time, from anywhere between 300 milliseconds to 2 seconds, for example. As apparent, slotted messages from the cellular network may be missed while the mobile device 102 is performing these functions. In accordance with teachings of the present application as described in more detail in relation to FIGS. 4-7, however, these issues can be alleviated.

Figure 2:
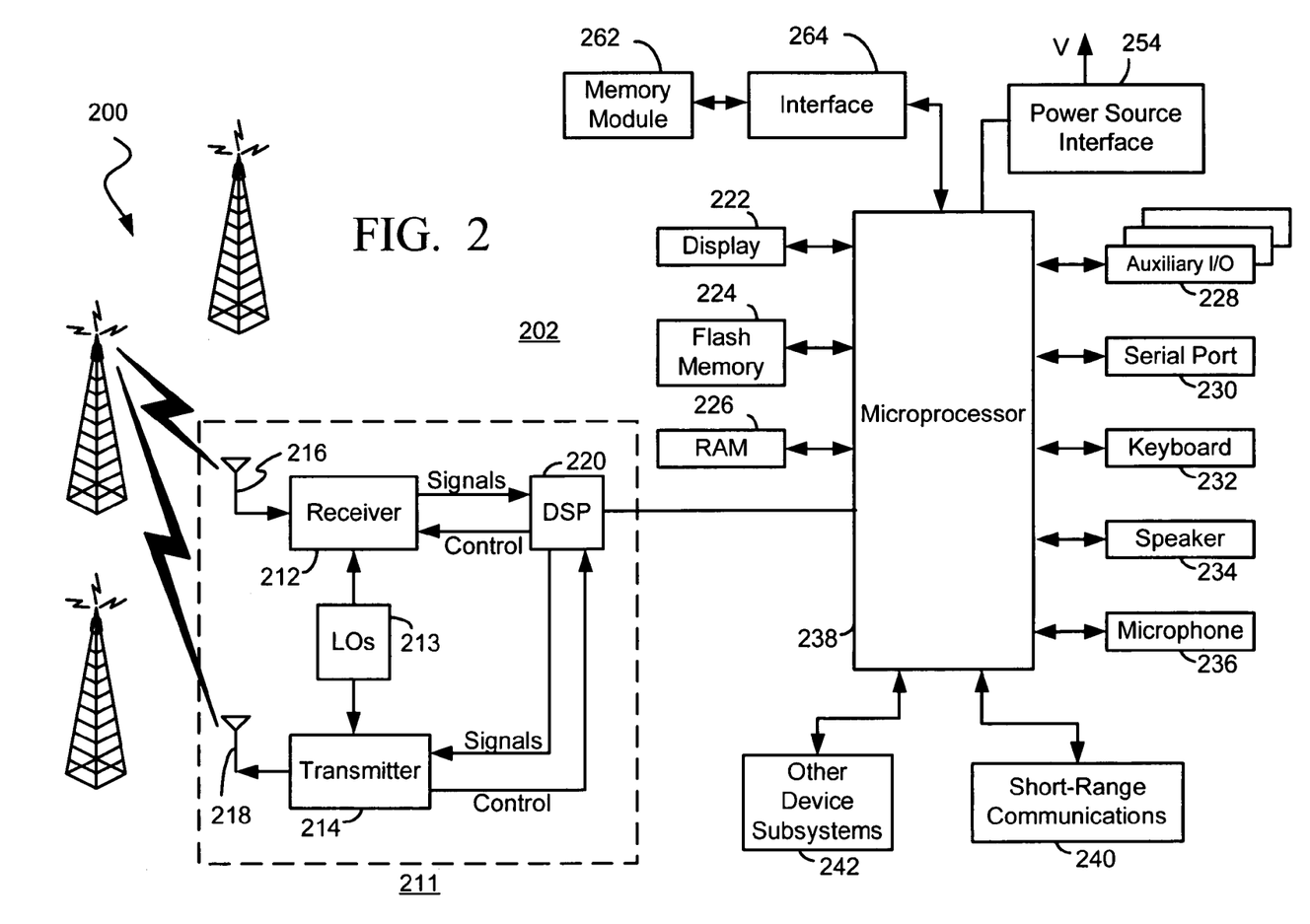
FIG. 2 is a more detailed diagram of a preferred mobile station of FIG. 1.

FIG. 2 is a detailed block diagram of a preferred mobile device, namely a mobile station 202. Mobile station 202 is preferably a two-way communication device having at least voice and advanced data communication capabilities, including the capability to communicate with other computer systems. Depending on the functionality provided by mobile station 202, it may be referred to as a data messaging device, a two-way pager, a cellular telephone with data messaging capabilities, a wireless Internet appliance, or a data communication device (with or without telephony capabilities). Mobile station 202 may communicate with any one of a plurality of base station transceiver systems 200 within its geographic coverage area. Mobile station 202 selects or helps select which one of base station transceiver systems 200 it will communicate with.

Mobile station 202 will normally incorporate a communication subsystem 211, which includes a receiver 212, a transmitter 214, and associated components, such as one or more (preferably embedded or internal) antenna elements 216 and 218, local oscillators (LOs) 213, and a processing module such as a digital signal processor (DSP) 220. Communication subsystem 211 is analogous to RF transceiver circuitry 108 and antenna 110 shown in FIG. 1. As will be apparent to those skilled in field of communications, particular design of communication subsystem 211 depends on the communication network in which mobile station 202 is intended to operate. Preferably, communication subsystem 211 has a first transceiver portion for communicating with the wireless network (e.g. cellular network) and a second transceiver portion for communicating with an alternative wireless network. For example, the first transceiver portion may be for communicating with a Personal Communication Services (PCS) network and the second transceiver portion may be for communicating with a GPS network. Antenna 216 is shared by the first and the second transceiver portions of communication subsystem 211. With this configuration, it is difficult for mobile station 202 to receive information from both networks at the same time, and if switching is performed then information from one network or the other will be missed.

Mobile station 202 may send and receive communication signals over the network (e.g. after required network registration or activation procedures have been completed). Signals received by antenna 216 through the network are input to receiver 212, which may perform such common receiver functions as signal amplification, frequency down conversion, filtering, channel selection, and like, and in example shown in FIG. 2, analog-to-digital (A/D) conversion. A/D conversion of a received signal allows more complex communication functions such as demodulation and decoding to be performed in DSP 220. In a similar manner, signals to be transmitted are processed, including modulation and encoding, for example, by DSP 220. These DSP-processed signals are input to transmitter 214 for digital-to-analog (D/A) conversion, frequency up conversion, filtering, amplification and transmission over communication network via antenna 218. DSP 220 not only processes communication signals, but also provides for receiver and transmitter control. For example, the gains applied to communication signals in receiver 212 and transmitter 214 may be adaptively controlled through automatic gain control algorithms implemented in DSP 220.

Network access is associated with a subscriber or user of mobile station 202, and therefore mobile station 202 requires a memory module 262, such as a Subscriber Identity Module or "SIM" card or a Removable User Identity Module (R-UIM), to be inserted in or connected to an interface 264 of mobile station 202 in order to operate in the network. Alternatively, a portion of the non-volatile memory or flash memory 224 is programmed with configuration data by a service provider so that mobile station 202 may operate in the network.

Since mobile station 202 is a portable battery-powered device, it also includes a power source interface 254 for receiving different power sources such as a battery pack or a secondary power source (described in relation to FIG. 1). Such a power source provides electrical power to most if not all electrical circuitry in mobile station 202, and interface 254 provides for a mechanical and electrical connection for it. Power source interface 254 is coupled to a regulator (not shown in FIG. 2) which provides power to all of the circuitry.

Mobile station 202 includes a microprocessor 238 (which is one implementation of controller 106 of FIG. 1) which controls overall operation of mobile station 202. This control includes slot reservation techniques of the present application. Communication functions, including at least data and voice communications, are performed through communication subsystem 211. Microprocessor 238 also interacts with additional device subsystems such as a display 222, a flash memory 224, a random access memory (RAM) 226, auxiliary input/output (I/O) subsystems 228, a serial port 230, a keyboard 232, a speaker 234, a microphone 236, a short-range communications subsystem 240, and any other device subsystems generally designated at 242. Some of the subsystems shown in FIG. 2 perform communication-related functions, whereas other subsystems may provide "resident" or on-device functions. Notably, some subsystems, such as keyboard 232 and display 222, for example, may be used for both communication-related functions, such as entering a text message for transmission over a communication network, and device-resident functions such as a calculator or task list. Operating system software used by microprocessor 238 is preferably stored in a persistent store such as flash memory 224, which may alternatively be a read-only memory (ROM) or similar storage element (not shown). Those skilled in the art will appreciate that the operating system, specific device applications, or parts thereof, may be temporarily loaded into a volatile store such as RAM 226.

Microprocessor 238, in addition to its operating system functions, preferably enables execution of software applications on mobile station 202. A predetermined set of applications which control basic device operations, including at least data and voice communication applications, will normally be installed on mobile station 202 during its manufacture. A preferred application that may be loaded onto mobile station 202 may be a personal information manager (PIM) application having the ability to organize and manage data items relating to user such as, but not limited to, e-mail, calendar events, voice mails, appointments, and task items. Naturally, one or more memory stores are available on mobile station 202 and SIM 256 to facilitate storage of PIM data items and other information.

The PIM application preferably has the ability to send and receive data items via the wireless network. In a preferred embodiment, PIM data items are seamlessly integrated, synchronized, and updated via the wireless network, with the mobile station user's corresponding data items stored and/or associated with a host computer system thereby creating a mirrored host computer on mobile station 202 with respect to such items. This is especially advantageous where the host computer system is the mobile station user's office computer system. Additional applications may also be loaded onto mobile station 202 through network, an auxiliary I/O subsystem 228, serial port 230, short-range communications subsystem 240, or any other suitable subsystem 242, and installed by a user in RAM 226 or preferably a non-volatile store (not shown) for execution by microprocessor 238. Such flexibility in application installation increases the functionality of mobile station 202 and may provide enhanced on-device functions, communication-related functions, or both. For example, secure communication applications may enable electronic commerce functions and other such financial transactions to be performed using mobile station 202.

In a data communication mode, a received signal such as a text message, an e-mail message, or web page download will be processed by communication subsystem 211 and input to microprocessor 238. Microprocessor 238 will preferably further process the signal for output to display 222 or alternatively to auxiliary I/O device 228. A user of mobile station 202 may also compose data items, such as e-mail messages, for example, using keyboard 232 in conjunction with display 222 and possibly auxiliary I/O device 228. Keyboard 232 is preferably a complete alphanumeric keyboard and/or telephone-type keypad. These composed items may be transmitted over a communication network through communication subsystem 211.

For voice communications, the overall operation of mobile station 202 is substantially similar, except that the received signals would be output to speaker 234 and signals for transmission would be generated by microphone 236. Alternative voice or audio I/O subsystems, such as a voice message recording subsystem, may also be implemented on mobile station 202. Although voice or audio signal output is preferably accomplished primarily through speaker 234, display 222 may also be used to provide an indication of the identity of a calling party, duration of a voice call, or other voice call related information, as some examples.

Serial port 230 in FIG. 2 is normally implemented in a personal digital assistant (PDA)-type communication device for which synchronization with a user's desktop computer is a desirable, albeit optional, component. Serial port 230 enables a user to set preferences through an external device or software application and extends the capabilities of mobile station 202 by providing for information or software downloads to mobile station 202 other than through a wireless communication network. The alternate download path may, for example, be used to load an encryption key onto mobile station 202 through a direct and thus reliable and trusted connection to thereby provide secure device communication.

Short-range communications subsystem 240 of FIG. 2 is an additional optional component which provides for communication between mobile station 202 and different systems or devices, which need not necessarily be similar devices. For example, subsystem 240 may include an infrared device and associated circuits and components, or a Bluetooth™ communication module to provide for communication with similarly-enabled systems and devices. Bluetooth™ is a registered trademark of Bluetooth SIG.

Figure 3:
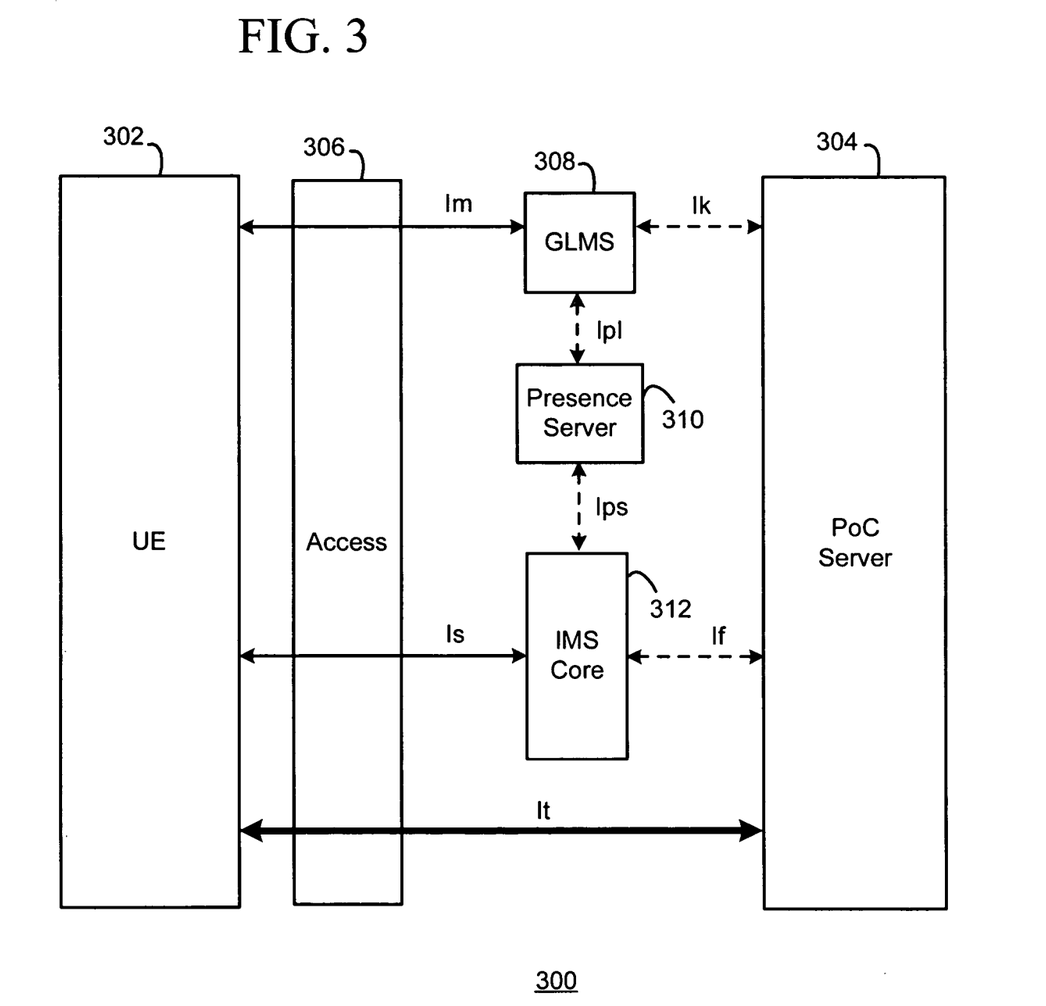
FIG. 3 is a block diagram of system components pertaining to Push-to-talk (PTT) over Cellular (PoC) communication sessions for the mobile station.

FIG. 3 is a block diagram of relevant system components 300 pertaining to Push-to-talk (PTT) over Cellular (PoC) communications which the mobile station may utilize. When the mobile station is utilizing PoC communications, it requests to operate in the reduced slotted mode. Alternatively, the base station may command the mobile station to operate in the reduced slotted mode when necessary. System components 300 include user equipment (UE) 302 which represents a mobile station, a Push-to-talk over Cellular (PoC) server 304, an access 306, a Group and List Management Server (GLMS) 308, an IP Multimedia Subsystem (IMS) core 312, and a presence server 310. Some of these components may be optional or not necessary for fundamental operation. The PoC architecture and signaling may be the same as is conventional as described in current standard specifications such as Push-to-talk over Cellular (PoC), Architecture, PoC Release 1.0—Architecture V1.1.0 (2003-08) Technical Specification; and Push-to-talk over Cellular (PoC), Signaling Flows, PoC Release 1.0—Signaling Flows V1.1.3 (2003-08) Technical Specification.

A PoC communication session is a session connection between end users of a UE 302, referred to as session "participants", who communicate one at a time in a half-duplex manner. PoC communication utilizes Voice over IP (VoIP) technology which involves the communication of data packets carrying voice information. UE 302 is terminal equipment (e.g. a mobile station) which includes PoC application client software, which includes functionality of the present application but otherwise utilizes conventional techniques. IMS core 312 includes a plurality of Session Initiation Protocol (SIP) proxies and SIP registrars. The first point of contact for UE 302 is one of the proxies in IMS core 312 that is configured on UE 302 as the outbound proxy. In the IMS architecture, the outbound proxy is known as the Proxy-CSCF (P-CSCF). IMS Core 312 performs the following functions: (1) routing of SIP signaling between UE 302 and PoC server 304; (2) termination of SIP compression from UE 302; (3) authentication and authorization; (4) maintenance of the registration state and the SIP session state; and (5) reporting to the charging system. UE 302 sends all its SIP messages to the IP address of the outbound proxy after resolving the SIP Uniform Resource Identifier (URI) of the outbound proxy to an IP address.

End users use GLMS 308 to manage groups, contact lists, and access lists. A contact list is a type of address book that may be used by end users to establish an instant talk session with other PoC users or PoC Groups. An end user may have one or several contact lists including identities of other PoC users or PoC groups. Contact list management includes operations to allow UE 302 to store and retrieve the contact lists located in GLMS 308. End users can define PoC groups. An end user may select one group from the list to initiate an instant group talk session or a chat group talk session, depending on the type of group. An access list is used by the end user as a means of controlling who is allowed to initiate instant talk sessions to the end user. An access list contains end user defined identities of other end users or groups. The end user may have one blocked identities list and one granted identities list.

PoC server 304 includes functionality to perform the PoC service. PoC Server 304 typically performs functions such as: (1) end-point for SIP signaling; (2) end-point for real-time transport protocol (RTP) and RTP Control Protocol (RTCP) signaling; (3) SIP session handling; (4) policy control for access to groups; (5) group session handling; (6) access control; (7) do-not-disturb functionality; (8) floor control functionality (floor control is a control mechanism that arbitrates requests, from the UEs, for the right to speak); (9) talker identification; (10) participant information; (11) quality feedback; (12) charging reports; and (13) media distribution. Presence server 310 manages presence information that is uploaded by presence user/network/external agents, and is responsible for combining the presence-related information for a certain presently from the information it receives from multiple sources into a single presence document.

An Is interface supports the communication between UE 302 and IMS core 312. This communication includes SIP procedures which support the PoC features. The protocol for the Is interface is Session Initiation Protocol (SIP). Is signaling is transported on User Datagram Protocol (UDP). The protocols over an If interface support the communication between IMS core 312 and PoC server 304 for session control. The protocols over an It interface support the transport of talk bursts, floor control, and link quality messages between UE 302 and PoC Server 304. The protocols over an Im interface support the communication between UE 302 and GLMS 308 for the purpose of managing the groups, contact lists and access lists and Do-not-Disturb indication. HTTP/XML protocols are utilized for these purposes. The protocols over an Ik interface support the communication between PoC Server 304 and GLMS 308, enabling PoC server 304 to retrieve the groups and access lists from GLMS 308. The protocols over an Ips interface enable the uploading of the registration status from IMS core 312 to presence server 310 and the dissemination of the presence information between presence server 310 and UE 302. The protocol over an Ipl interface enables the uploading of Do-not-Disturb status and granted/blocked access lists from GLMS 308 to presence server 310. The group identity used on the Is interface between the UE and IMS core for group talk is generated by GLMS 308.

Each entity in the PoC system is assigned one or more IP addresses belonging to public or private IP realms. On the other hand, a end user may address another user by a phone number. UE 302 sends a phone number to IMS core 312 in a TEL Uniform Resource Locator (URL). The phone number may use the international E.164 format (prefixed with a '+' sign) or a local format using a local dialing plan and prefix. IMS core 312 interprets the phone number with a leading '+' to be an E.164 number. Addressing by TEL URL for a PoC session requires that PoC Server 304 can resolve the TEL URL to a SIP URI, for instance by using DNS/ENUM or other local data base. A phone number in a local format is converted to the E. 164 format before DNS/ENUM is used.

End users may initiate PoC talk sessions. An INVITE request on the Is interface contains an "Accept-Contact" header with a media feature tag indicating the PoC service. IMS core 312 is able to identify the request as a PoC communication by inspecting the Accept-Contact header. A Request-URI of the INVITE contains either the pre-configured ad-hoc identity (for instant personal talk and ad-hoc instant group) or a group identity (for instant group talk or chat group talk). Early session establishment is used for having a session available for quick connection establishment using "REFER". The early session establishment's INVITE does not have any referred party field and can be differentiated from this against other INVITEs. A transient group identity is generated by PoC server 304 and distributed to UE 302 in the "Contact" header. From an initiating UE 302, the public user identity of the inviting user is included in the "From" header. On the signaling towards the invited user, the "From" header includes either the public user identity (instant personal talk, ad-hoc instant group) or the group identity (instant group talk or being added to a chat group).

Figure 4:
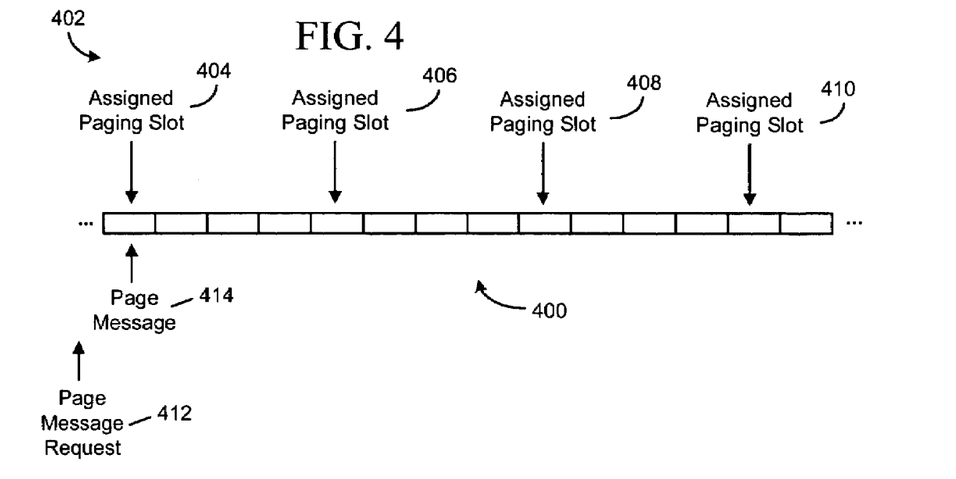
FIG. 4 is an illustrative representation of paging slots for the communication of page messages to the mobile station.

FIG. 4 is an illustrative representation of a plurality of paging slots 400 for the communication of page messages to a mobile device. The plurality of paging slots 400 have a plurality of assigned paging slots 402 for the mobile device which include paging slots 404, 406, 408, and 410. These paging slots are regular or periodic, and separated in time by a fixed time period. All other paging slots in between the assigned paging slots 402 shown in FIG. 4 are not assigned to the mobile device, and provide time periods during which the mobile device may operate in a sleep mode or perform other transceiver operations.

When operating in a normal slotted mode, the mobile device wakes up to monitor for slotted messages in paging slots at predetermined intervals. For example, in CDMA communications defined by IS-2000, the mobile device wakes up to monitor for slotted messages in paging slots at an interval of $1.28*2^i$ seconds, where i is an integer value ranging from 0 to 7. The value of i is referred to as a "Slot Cycle Index" and is chosen by the mobile device and registered with the network. Slotted messaging has been utilized in wireless communication networks for many years in an effort to conserve battery power in mobile devices. In Release D of IS-2000, a new feature that allows mobile devices to operate in a "reduced slotted mode" while idling and monitoring for pages has been defined. Specifically, the reduced slotted mode allows values of $-4$ to $-1$ for the Slot Cycle Index i. This enables faster call setup times for mobile-terminated calls. A shortened slot cycle for faster call setup is highly desirable for certain applications such as Push-To-Talk (PTT) communication applications. Note that the reduced slotted mode may be negotiated between the mobile device and the network at the time of call release, for example. In this case, the agreed upon value of i for the reduced slotted mode is active for a period of time before the mobile device and the network revert to the prior value of i for the normal slotted mode. Furthermore, when the mobile device is idle a new value of i can be negotiated to be active for a period of time.

Another reason that a mobile device may request to operate in the reduced slotted mode is unrelated to the need for fast call setup or PTT communications. In particular, if a mobile device is operating with a relatively high capacity or large power source (e.g. a wall power source, an automobile power source, or a PC power source through USB connection), it may request a shortened slot cycle as power savings is not a concern. The mobile device requests the reduced slot cycle in order to benefit from reduced call setup times even when another feature that requires it (e.g. PTT communications) is not active.

In conventional operation, the mobile device has a relatively large amount of time in between paging slots in the normal slotted mode. During this time period, the mobile device is able to operate in a "sleep mode" or perform any other operation that would otherwise not be possible while monitoring for pages. Such operations include searching for a Global Positioning System (GPS) signal, scanning other CDMA frequencies different from the current one, or scanning for other wireless networks such as 802.11 (e.g. WiFi), GSM/GPRS, or UMTS networks. In the reduced slotted mode, however, the mobile device does not have adequate time between paging slots to perform such operations. If the mobile device performs such an operation in the reduced slotted mode, it may miss an assigned paging slot. If the network happens to page the mobile device during this assigned paging slot, the mobile device will miss the page which may create a significant delay in call setup. It is for this reason that conventional mobile device cannot suitably operate in this fashion while in the reduced slotted mode.

Figure 5:
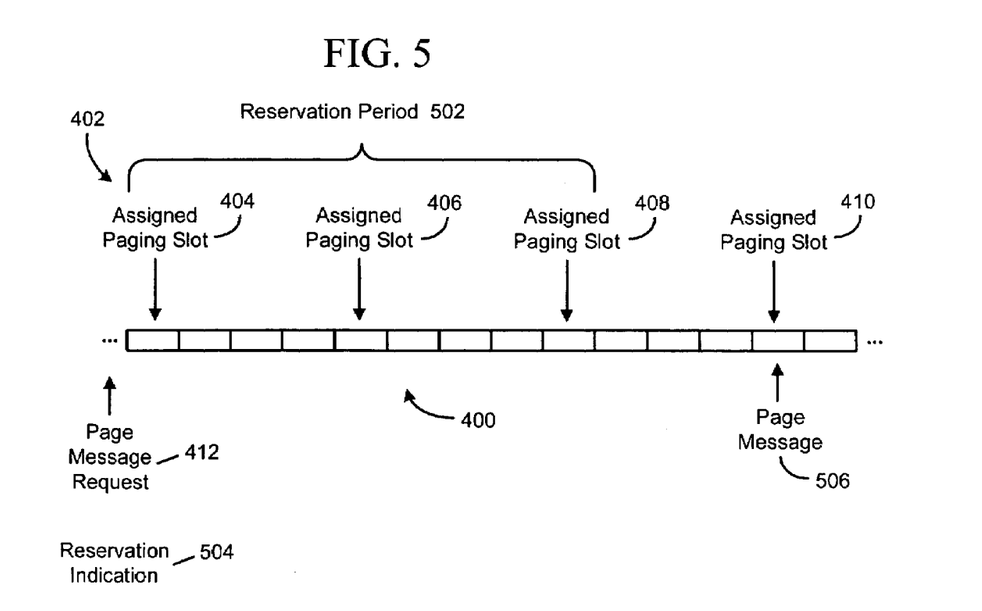
FIG. 5 is an illustrative representation of paging slots for the communication of page messages to the mobile station with a tolerable delay.

FIG. 5 is an illustrative representation of the plurality of paging slots 400 of FIG. 4 for the communication of page messages to the mobile device, using slot reservations for slotted messages. A reservation indication 504 associated with the mobile device is utilized within the wireless network to provide a slot reservation period 502 within which page messages must not be sent to the mobile device. Specifically, reservation indication 504 represents a time period or a number of paging slots within which the page messages must not be sent by the wireless network to the mobile device. Reservation period 502 is greater than or equal to one or more paging slot time periods, and preferably greater than or equal to two or more paging slot time periods.

Preferably, reservation indication 504 is for reserving each nth paging slot(s) assigned to the mobile device, where n is an integer greater than or equal to two (2). The value of n may be, for example, 2, 4, 8, 16, etc. As apparent, the wireless network defers or refrains from causing any page message for the mobile device associated with such reservation indication to be transmitted within each nth paging slot(s) (e.g. each nth set of assigned paging slots 404, 406, and 408) associated with the reservation. The wireless network may instead cause a deferred page message 506 to be transmitted within one or more subsequent paging slots 410 assigned to the mobile device immediately after reservation period 502 has expired. The mobile device may operate to refrain from monitoring for any page messages within each nth paging slot(s) (e.g. each nth set of assigned paging slots 404, 406, and 408) associated with the reservation.

Reservation indication 504 may be as simple as a binary indication or a bit flag, where '0'=no reservation and '1'=reservation=predetermined time period T or number of paging slots N and/or the value n. Alternatively, reservation indication 504 may be a value that is correlated to the time period or number of paging slots within which page messages must be sent. Such indications 504 may be sent from the mobile devices to the network or, alternatively, may be inferred by the network based on other data associated with the mobile device which reveals such need. In particular, the wireless network may infer a reservation through use of a neighbor list message associated with the mobile device, such as a Neighbor List Message, an Extended Neighbor List Message, or a General Neighbor List Message sent on a control channel such as the Paging Channel or the Broadcast Common Control Channel. In this case, the wireless network may identify within the message the presence of a frequency different from the current network frequency, or the presence of a wireless technology different from that of the current network (e.g. High Rate Packet Data or HRPD, Wideband CDMA, GSM/GPRS, WLAN, etc.). In response to such identification, the wireless network sets a reservation for the wireless device for a period of time which is preferably indefinite.

Figure 6:
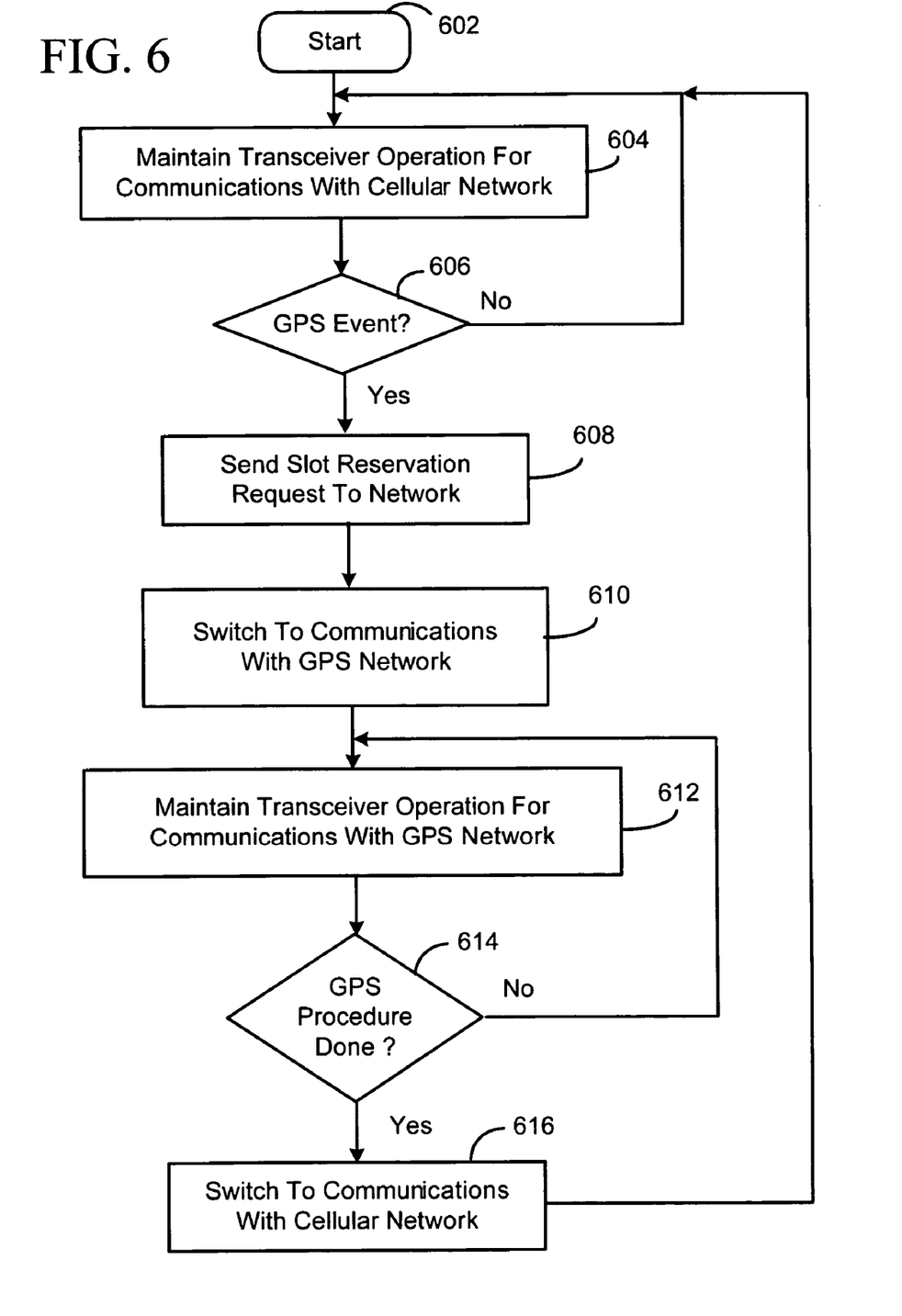
FIG. 6 is a flowchart for describing a mobile device method of providing slot reservations for slotted messages in the wireless network.

FIG. 6 is a flowchart for describing a mobile device method of providing slot reservations for slotted messages in the wireless network. The method of FIG. 6 is performed by a mobile device operating in a wireless network (e.g. see FIGS. 1-2). As described in relation to FIGS. 1-2, the mobile device may include a wireless transceiver, an antenna coupled to the wireless transceiver, and one or more processors coupled to these components and operative to perform the acts of the method. Specifically, the wireless transceiver may have a first transceiver portion for communicating with the wireless network (e.g. cellular or PCS network) and a second transceiver portion for communicating with an alternative wireless network (e.g. GPS network), where the antenna is shared by the first and the second transceiver portions. In this case, the one or more processors are further operative for monitoring a channel of the alternative wireless network with use of the second transceiver portion during the reserved paging slots. Note that a computer program product of the present application may include computer instructions stored on a storage medium (memory, a floppy disk or CD-ROM) which are written in accordance with the described logic.

Beginning at a start block 602 of FIG. 6, the mobile device maintains operation of its wireless (RF) transceiver for communications with the cellular telecommunications network (step 604 of FIG. 6). During this time, the mobile device is monitoring for page messages with the cellular network for each one of its assigned paging slots. Specifically, the mobile device is operating in a PTT mode or PoC mode of communications with use of the reduced slotted mode of paging.

During this time, the mobile device identifies whether a particular function must be performed. This function will cause the mobile device to switch its wireless transceiver away from the current channel or frequency (e.g. CDMA channel or frequency). This function may be, for example, a network scanning operation. In the present embodiment, the function is a GPS fix as described earlier above. Thus in this embodiment the mobile device identifies whether a GPS function must be performed (step 606 of FIG. 6). If not, the mobile device maintains the transceiver operation with the cellular network.

If the GPS function must be performed at step 606, the mobile device transmits a slot reservation request to the cellular network (step 608 of FIG. 8). The slot reservation request includes a slot reservation indication as described in relation to FIG. 5, which represents a slot reservation period within which page messages must not be sent to the mobile device. Specifically, the reservation indication represents a time period or a number of paging slots within which the page messages must not be delivered to the mobile device. The reservation period is greater than or equal to one or more paging slot time periods, and preferably greater than or equal to two or more paging slot time periods. Even more specifically, the reservation period is equal to or greater than the time period to perform the predetermined function (e.g. the GPS fix) identified in step 606. Preferably, the slot reservation request is for reserving each nth paging slot(s) assigned to the mobile device, where n is an integer greater than or equal to two (2). The value of n may be, for example, 2, 4, 8, 16, etc.

The mobile device may not need to send the slot reservation request in step 608 as it may have previously sent such a request, where a reservation for each nth paging slot(s) is already understood. Such a reservation may be made for a relatively long period of time or indefinitely, and may or may not be terminated by the mobile device at some point in time. Here, the mobile device merely needs to identify the next reserved paging slot(s) during which to perform the function.

The mobile device then switches for communications with the GPS network (step 610 of FIG. 6). The mobile device then maintains operation of the wireless transceiver for communications with the GPS network (step 612 of FIG. 6). When operating for communications with the GPS network, the mobile device is unable to hear or listen to signals or communicate with the cellular network if its GPS receive path is shared with the cellular frequency. As apparent, the mobile device refrains from monitoring for any slotted messages in the reserved paging slot(s). Specifically in step 612, the mobile device may be performing a "GPS fix". The mobile device must tune to a GPS signal frequency of the GPS system which is different than that utilized for communications with the current network and receive location information. The mobile device obtains GPS information based on signals received from the GPS system which helps measure and obtain its current location. During operation of the mobile device in step 612, real-time GPS location information may be obtained and sent to a receiving entity.

If the GPS function is not yet completed as identified in step 614, the mobile device continues to perform the GPS function. Otherwise, when the GPS function is completed as identified in step 614, the mobile device switches back for communications with the cellular network (step 616 of FIG. 6). Operation of the wireless transceiver for communications with the cellular network is then maintained again at step 604. During this time, the mobile device again monitors for page messages with the cellular network for each one of its assigned paging slots. As apparent, the flowchart repeats for all subsequent operation of the mobile device.

Thus, in step 612 of FIG. 6 the mobile device tunes away from the current network channel one or more times and, for each time, from anywhere between 300 milliseconds to 2 seconds, for example. As apparent, slotted messages from the network may be missed while the mobile device is performing these functions. Advantageously, however, since the mobile device has reserved paging slots in the network, the network refrains from sending any slotted messages (such as page messages) to the mobile device during the one or more reserved paging slots.

Figure 7:
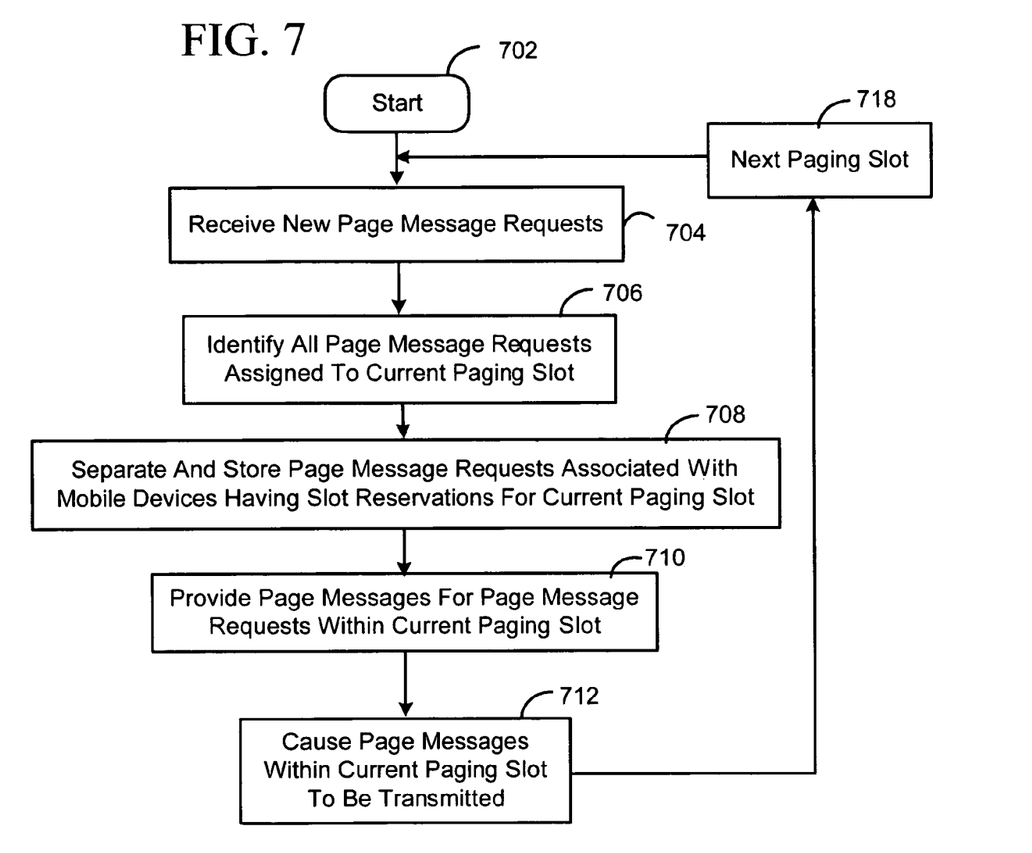
FIG. 7 is a flowchart for describing a network method of providing slot reservations for slotted messages in the wireless network.

FIG. 7 is a flowchart for describing a network method of providing slot reservations for slotted messages in the wireless network. The method of FIG. 7 is performed by a network processing component within the wireless network (e.g. see FIG. 1. The network processing component may be included within the base station controller or the base station, for example, depending on the specific implementation. The network processing component may include one or more processors; memory coupled to the one or more processors; and computer instructions stored in the memory and executable by the one or more processors to perform the acts of the method. Also, a computer program product of the present application may include computer instructions stored on a storage medium (memory, a floppy disk or CD-ROM) which are written in accordance with the described logic.

Beginning at a start block 702 of FIG. 7, the wireless network receives a plurality of new slotted message requests (e.g. page message requests) for paging mobile devices which operate in the network (step 704 of FIG. 7). Next, the wireless network identifies all slotted message requests which may be provided within the current paging slot (step 706 of FIG. 7). The wireless network then identifies those requests for mobile devices which have current reservation periods, and separates and stores those requests for later handling (step 708 of FIG. 7). Next, the wireless network provides slotted messages for these requests within the current paging slot, prioritizing those requests for mobile devices that do not have any slot reservations (step 710 of FIG. 7). The wireless network then causes the slotted messages for the current paging slot to be transmitted (step 712 of FIG. 7). The subset of slotted messages are then transmitted within the current paging slot. As apparent, the wireless network refrains from causing slotted messages to be transmitted within the current paging slot based on identifying slot reservations for mobile devices associated therewith. On the other hand, the wireless network causes slotted messages to be transmitted within the paging slot based on failing to identify any reservation indications for mobile devices associated therewith.

Note that the wireless network keeps a counter or timer associated with each reservation indication; the value of the counter or timer is set in accordance with the reservation indication and started upon receipt of the request. Once the counter or timer has expired, the reservation period is over and any slotted message request to the mobile device is treated with the same priority as the other typically-handled page message requests. Therefore, the wireless network subsequently causes a slotted message for the mobile device with the reservation indication to be transmitted within a subsequent paging slot after the reservation period associated with the reservation is over. When a reservation is made for each nth paging slot(s), another (second) counter or timer may be utilized for identifying when the next slot reservation begins. Once this second counter or timer has expired, the reservation period begins where any page messages to the mobile device are deferred.

As described earlier above, the wireless network may also infer the need for a reservation for the mobile device instead of receiving such an indication from the mobile device. In particular, the wireless network may infer a reservation through use of a neighbor list message associated with the mobile device, such as a Neighbor List Message, an Extended Neighbor List Message, or a General Neighbor List Message sent on a control channel such as the Paging Channel or the Broadcast Common Control Channel. In this case, the wireless network may identify within the message the presence of a frequency different from the current network frequency, or the presence of a wireless technology different from that of the current network (e.g. High Rate Packet Data or HRPD, Wideband CDMA, GSM/GPRS, WLAN, etc.). In response to such identification, the wireless network sets a reservation for the wireless device for some period of time. Note that the mobile device itself may cause a reservation to be made based on the neighbor list message.

Thus, methods and apparatus for providing slot reservations for slotted messages in a wireless communication network have been described. In one illustrative example, a mobile communication device transmits a slot reservation indication to the wireless network for reserving each nth paging slot assigned to the mobile device. At some point in time, a slotted message request (e.g. a page message request for paging) the mobile device is received within the wireless network. A slotted message for the mobile device is refrained from being transmitted within a reserved paging slot, but rather within a subsequent paging slot assigned to the mobile device after a lapse of time associated with the reserved paging slot. During the slot reservation, the mobile device may perform a function such as a GPS location fix or network scanning operation. As an alternative to the indication being sent from the mobile device, the wireless network may infer the need for a reservation request for the mobile device in response to other information. In particular, the wireless network may infer a reservation by examining a neighbor list message for the mobile device, such as a Neighbor List Message, an Extended Neighbor List Message, or a General Neighbor List Message sent on a control channel such as the Paging Channel or the Broadcast Common Control Channel. In this case, the wireless network may identify within the message the presence of a frequency different from the current network frequency, or the presence of a wireless technology different from that of the current network, and set the reservation for the mobile device in response. This described method may be performed by a network processing component which is included within the base station controller or the base station, for example, depending on the specific implementation; the network processing component may include one or more processors; memory coupled to the one or more processors; and computer instructions stored in the memory and executable by the one or more processors to perform the acts of the method. Also, a computer program product of the present application may include computer instructions stored on a storage medium (memory, a floppy disk or CD-ROM) which are written in accordance with the described method steps.

A related mobile device method includes the steps of causing a slot reservation indication to be transmitted from the mobile device to the wireless network, where the slot reservation indication is for reserving each nth paging slot of the wireless network which is assigned to the mobile device; and refraining from monitoring for any page messages in the reserved paging slots after transmitting the slot reservation indication. A computer program product of the present application may include computer instructions stored on a storage medium (memory, a floppy disk or CD-ROM) which are written in accordance with the described method steps. The mobile device which performs this method may include a wireless transceiver, an antenna coupled to the wireless transceiver, and one or more processors coupled to these components and operative to perform the acts of the method. Specifically, the wireless transceiver may have a first transceiver portion for communicating with the wireless network and a second transceiver portion for communicating with an alternative wireless network, where the antenna is shared by the first and the second transceiver portions, and the one or more processors are further operative for monitoring a channel of the alternative wireless network with use of the second transceiver portion during the reserved paging slots.

The above-described embodiments of the present application are intended to be examples only. For example, the alternative network may be a High Rate Packet Data (HRPD) network, a Wideband CDMA network, a GSM/GPRS network, or a WLAN network. Those of skill in the art may effect alterations, modification, and variations to the particular embodiments without departing from the scope of the application. The invention described herein in the recited claims intends to cover and embrace all suitable changes in technology.

What is claimed is:

1. A method for use in providing slot reservations for paging slots in a wireless communication network, the method comprising the steps of:
    monitoring, in the wireless network, for a slot reservation indication from a mobile communication device via the wireless network;
    receiving, in the wireless network, a page message request for establishing voice or data communications for the mobile device;
    causing a page message which corresponds to the page message request for establishing the voice or the data communications to be transmitted within one or more paging slots assigned to the mobile device based on failing to receive any slot reservation indication from the mobile device; and
    causing the page message which corresponds to the page message request for establishing the voice or the data communications to be transmitted within one or more subsequent paging slots assigned to the mobile device after a lapsing of time associated with the one or more paging slots of the reservation based on receiving the slot reservation indication from the mobile device.

2. The method of claim 1, further comprising:
    refraining from causing the page message which corresponds to the page message request for establishing the voice or the data communications to be transmitted within the one or more paging slots based on receiving the slot reservation indication from the mobile device.

3. The method of claim 1, wherein the page message request is for establishing the voice communications.

4. The method of claim 1, wherein the page message request is for establishing the data communications.

5. The method of claim 1, wherein the slot reservation indication is for reserving each nth paging slot assigned to the mobile device.

6. The method of claim 1, wherein the slot reservation indication is set in the mobile device, without user intervention, based on an identification to monitor a different channel of the same or different wireless network during the one or more paging slots.

7. A computer program product, comprising:
    a storage medium;
    computer instructions stored on the storage medium;
    the computer instructions being executable by one or more processors for:
        monitoring, in a wireless communication network, for a slot reservation indication from a mobile communication device via the wireless network;
        receiving, within the wireless network, a page message request for establishing voice or data communications for the mobile device;
        causing a page message which corresponds to the page message request for establishing the voice or the data communications to be transmitted within one or more paging slots assigned to the mobile device based on failing to receive any slot reservation indication from the mobile device; and
        causing the page message which corresponds to the page message request for establishing the voice or the data communications to be transmitted within one or more subsequent paging slots assigned to the mobile device after a lapsing of time associated with the one or more paging slots of the reservation based on receiving the slot reservation indication from the mobile device.

8. The computer program product of claim 7, wherein the computer instructions are further executable for:
    refraining from causing the page message which corresponds to the page message request for establishing the voice or the data communications to be transmitted within the one or more paging slots based on receiving the slot reservation indication from the mobile device.

9. The computer program product of claim 7, wherein the page message request is for establishing the voice communications.

10. The computer program product of claim 7, wherein the page message request is for the data communications.

11. The computer program product of claim 7, wherein the slot reservation indication is for reserving each nth paging slot assigned to the mobile device.

12. The computer program product of claim 7, wherein the slot reservation indication is set in the mobile device, without user intervention, based on an identification to monitor a different channel of the same or different wireless network during the one or more paging slots.

13. A network processing component for use in a wireless communication network, comprising:
    one or more processors;
    memory;
    computer instructions stored in the memory;
    the computer instructions being executable by the one or more processors for:
        monitoring for a slot reservation indication from a mobile communication device via the wireless network;
        receiving a page message request for establishing voice or data communications for the mobile device;
        causing a page message which corresponds to the page message request for establishing the voice or the data communications to be transmitted within one or more paging slots assigned to the mobile device based on failing to receive any slot reservation indication from the mobile device; and
        causing the page message which corresponds to the page message request for establishing the voice or the data communications to be transmitted within one or more subsequent paging slots assigned to the mobile device after a lapsing of time associated with the one or more paging slots of the reservation based on receiving the slot reservation indication from the mobile device.

14. The network processing component of claim 13, wherein the computer instructions are further executable for:
    refraining from causing the page message which corresponds to the page message request for establishing the voice or the data communications to be transmitted within the one or more paging slots based on receiving the slot reservation indication from the mobile device.

15. The network processing component of claim 13, wherein the page message request is for establishing the voice communications.

16. The network processing component of claim 13, wherein the page message request is for establishing the data communications.

17. The network processing component of claim 13, wherein the slot reservation indication is for reserving each nth paging slot assigned to the mobile device.

18. A method in a mobile communication device for controlling slot reservations for paging slots in a wireless communication network with use of a slot reservation indication, the slot reservation indication for reserving one or more paging slots of the wireless network, the method comprising the steps of:
if the slot reservation indication is not transmitted from the mobile device to the wireless network, then monitoring for a page message for establishing voice or data communications in the one or more paging slots assigned to the mobile device; and
if the slot reservation indication is transmitted from the mobile device to the wireless network, then refraining from monitoring for the page message for establishing the voice or the data communications in the one or more paging slots of the wireless network.

19. The method of claim 18, wherein the slot reservation indication is for reserving each nth paging slot of the wireless network which is assigned to the mobile device.

20. The method of claim 18, further comprising:
monitoring a different channel of the same or different wireless network during the one or more reserved paging slots.

21. The method of claim 18, further comprising:
performing a Global Positioning System (GPS) fix during the one or more reserved paging slots.

22. The method of claim 18, further comprising:
performing a network scanning operation during the one or more reserved paging slots.

23. The method of claim 18, further comprising:
identifying a predetermined frmnction to be performed with use of a wireless transceiver of the mobile device; and
setting the slot reservation indication based on identifying the predetermined function to be performed.

24. A computer program product, comprising:
a storage medium;
computer instructions stored on the storage medium;
the computer instructions being executable by one or more processors of a mobile communication device for use in controlling slot reservations for paging slots of a wireless communication network with use of a slot reservation indication, the slot reservation indication for reserving one or more paging slots of the wireless network, the computer instructions being further executable for:
if the slot reservation indication is not transmitted from the mobile device to the wireless network, then monitoring for a page message for establishing voice or data communications in the one or more paging slots assigned to the mobile device; and
if the slot reservation indication is transmitted from the mobile device to the wireless network, then refraining from monitoring for the page message for establishing the voice or the data communications in the one or more paging slots of the wireless network.

25. The computer program product of claim 24, wherein the slot reservation indication is for reserving each nth paging slot of the wireless network which is assigned to the mobile device.

26. The computer program product of claim 24, wherein the computer instructions are further executable for:
monitoring a different channel of the same or different wireless network during the one or more reserved paging slots.

27. The computer program product of claim 24, wherein the computer instructions are further executable for:
performing a Global Positioning System (GPS) fix during the one or more reserved paging slots.

28. The computer program product of claim 24, wherein the computer instructions are further executable for:
performing a network scanning operation during the one or more reserved paging slots.

29. The computer program product of claim 24, wherein the computer instructions are further executable for:
identifying a predetermined function to be performed with use of a wireless transceiver of the mobile device; and
setting the slot reservation indication based on identifying the predetermined function to be performed.

30. A mobile communication device, comprising:
one or more processors;
a wireless transceiver coupled to the one or more processors;
the one or more processors being operative to control slot reservations for paging slots of a wireless communication network with use of a slot reservation indication, the slot reservation indication for reserving one or more paging slots of the wireless network, the one or more processors being further operative to:
if the slot reservation indication is not transmitted to the wireless network via the wireless transceiver, then monitor for a page message for establishing voice or data communications in the one or more paging slots assigned to the mobile device; and
if the slot reservation indication is transmitted to the wireless network via the wireless transceiver, then refrain from monitoring for the page message for establishing the voice or the data communications in the one or more paging slots of the wireless network.

31. The mobile device of claim 30, wherein the slot reservation indication is for reserving each nth paging slot of the wireless network which is assigned to the mobile device.

32. The mobile device of claim 30, wherein the one or more processors are further operative for:
monitoring a different channel of the same or different wireless network during the one or more reserved paging slots.

33. The mobile device of claim 30, wherein the one or more processors are further operative for:
performing a Global Positioning System (GPS) fix during the one or more reserved paging slots.

34. The mobile device of claim 30, wherein the one or more processors are further operative for:
performing a network scanning operation during the one or more reserved paging slots.

35. The mobile device of claim 30, wherein the wireless network comprises a first wireless network and the mobile device further comprises:
the wireless transceiver having a first transceiver portion and a second transceiver portion;
the first transceiver portion for communicating with the first wireless network;

the second transceiver portion for communicating with a second wireless network;
an antenna which is shared by the first and the second transceiver portions; and
the one or more processors being further operative for monitoring a channel of the second wireless network with use of the second transceiver portion during the one or more reserved paging slots.

36. The mobile device of claim 30, wherein the one or more processors are further operative to:
identify a predetermined function to be performed with use of the wireless transceiver; and
set the slot reservation indication based on identifying the predetermined function to be performed.

* * * * *